United States Patent Office 3,073,794
Patented Jan. 15, 1963

3,073,794
SPRAYABLE, ANHYDROUS SOLUTION OF 1-VINYL-2-PYRROLIDONE POLYMER IN CHLOROFLUORO HYDROCARBON PROPELLANT
George G. Stoner, Easton, Pa., assignor to General Aniline & Film Corporation, New York, N.Y., a corporation of Delaware
No Drawing. Filed May 22, 1959, Ser. No. 814,999
6 Claims. (Cl. 260—33.8)

This invention relates to film-forming compositions, and relates more particularly to sprayable film-forming compositions which are non-flammable and non-alcoholic and which are eminently suitable for therapeutic purposes.

This application is a continuation-in-part of my application Serial No. 580,443, filed April 25, 1956 and now abandoned.

There are many instances in which a smooth, even layer of solid polymer is desired, particularly for therapeutic purposes, but to the present no satisfactory procedure has been developed for applying such layers on the human system. Polyvinylpyrrolidone is a well known water-soluble polymer which, if applied to human tissues, would exert many very valuable effects. For instance, a thin layer of polyvinylpyrrolidone on human skin absorbs enough ultraviolet so that a relatively unclad bather, coated with a thin layer of polyvinylpyrrolidone, can bask in the sun indefinitely without sunburning, but will obtain an excellent smooth tan.

Similarly, the very high-molecular-weight polyvinylpyrrolidones have a sufficiently low water solubility to be highly desirable as coatings for injuries such as burns, bruises, cuts and the like. Heretofore, Collodion, which is a solution of approximately 4 grams of pyroxylin (chiefly nitrocellulose) in 100 milliliters of 1 volume of alcohol and 3 volumes of ether containing about 70 percent ether and 24 percent absolute alcohol by volume, applied by a brush from an alcohol solution has been used (under the name of "nu-skin"), but the resulting layer is water-impervious and water-insoluble whereas a similar layer of polyvinylpyrrolidone is not impervious to exudate, does not contract or shrink and can be removed by a gentle stream of water, which is not the case with collodion.

Another advantageous use of polyvinylpyrrolidones is in surgery. Thus, their characteristic water solubility, but slow solubility, make them desirable as coatings to separate tissues between which adhesions might tend to occur after surgery. A film of polyvinylpyrrolidone deposited upon internal organs during surgery will greatly reduce the danger of adhesions, and the material does not need to be removed before the incision is closed since it is resorbed in normal course. Many other uses will be obvious to those skilled in the art.

In accordance with the instant invention, a highly desirable composition consists in a solution of a spirit-soluble polymer, such as polyvinylpyrrolidone, in a chlorofluoro compound of relatively, or moderately, low boiling point which may be below room temperature or somewhat above, but in any event is such as to permit of a rapid evaporation of the solvent, to leave behind a thin, deposited film of the polymer. Basically, a suitable polymer is a "1-vinyl-2-pyrrolidone polymer" and this is the principal component. However, the term is also defined herewith to include not only the homopolymers but also a wide range of heteropolymers, copolymers, interpolymers, terpolymers (three-component polymers) and, in general, polymers in which vinylpyrrolidone is either the sole component, a major component or a substantial component. In the latter two instances the vinylpyrrolidone is copolymerized with such substances as vinyl acetate, isopropenyl acetate, vinyl laurate, vinyl stearate, vinyl oleate, vinyl benzoate, and other vinyl and isopropenyl esters; vinyl chloride, 2-chloropropene, and other vinyl and isopropenyl halides; methyl vinyl ether, ethyl vinyl ether, isopropyl vinyl ether, isobutyl vinyl ether, 2-ethoxyethyl vinyl ether, phenyl vinyl ether and other vinyl ethers; acrylic acid and methacrylic acid; maleic anhydride, chloromaleic anhydride, citraconic anhydride, and itaconic anhydride; methyl methacrylate, hexyl acrylate, methyl alpha-chloroacrylate, etc.; acrylonitrile, methacrylonitrile, acrylamide, and methacrylamide; acrolein and alpha-methylacrolein; styrene, ethylene, isoprene, 1,3-butadiene, and isopropenylbenzene; 9-vinylcarbazole; and allyl esters.

The preferred solvents for the above vinylpyrrolidones are the chlorofluoro compounds identified broadly as the Freons. The following tables set out solvents for the polyvinylpyrrolidone:

TABLE 1
*Hydrogen-Containing Chlorofluoroalkanes*

| Formula | Trade name | B.P.,°C. | Chemical name | Additional comments |
|---|---|---|---|---|
| $CHCl_2F$ | Freon 21 | 9 | Dichlorofluoro-methane | M.P., $-127°C$. $d°$, 1.422 g./ml. |
| $CHClF_2$ | Freon | $-41$ | Chlorodifluoro-methane | M.P.$-146°$ C. |
| $CHCl_2-CHF_2$ | | 60 | 1,1-dichloro-2,2-difluoroethane | $d^{25}$, 1.473 g./ml. |
| $CHCl_2-CClF_2$ | | 72 | 1,2,2-trichloro-1,1-difluoroethane | $d^{25}$, 1.54 g./ml. |
| $CHCl_2-CHClF$ | | 102 | 1,1,2-trichloro-2-fluoroethane | $d^{17}$, 1.550 g./ml. |

It will be observed that all of these solvents contain the "methine" group; that is, $-CH=$. Other compounds which are useful in the present invention are shown in Table 2:

TABLE 2

| Formula | B.P., ° C. | M.P., ° C. | Density, g./ml. (° C.) |
|---|---|---|---|
| $CCl_3-CHClF$ | 117 | $-95$ | 1.625 (20) |
| $CCl_2F-CHCl_2$ | 117 | $-83$ | 1.622 (20) |
| $CHF_2-CCl_3$ | 73 | | 1.566 (20) |
| $CHClF-CCl_2F$ | 72 | | 1.549 (25) |
| $CHClF-CClF_2$ | 28 | | 1.496 (10) |
| $CHCl_2-CF_3$ | | | |
| $CHF_2-CCl_2F$ | | | |
| $CHF_2-CClF_2$ | | | |
| $CHClF-CF_3$ | | | |
| $CHClF-CHClF$ | | | |
| $CHClF-CHF_2$ | 17 | | 1.365 (10) |
| $CHF_2-CHF_2$ | $-23$ | | |
| $CHF=CCl_2$ | 37 | $-109$ | 1.383 (20) |
| $CHCl=CHF$ | 10 | | |

The solvents listed in these two tables show boiling points from $-41°$ C. to $117°$ C. The lower boiling point solvents are particularly useful for situations in which it is desired to apply a dense, closely adherent layer of polymer free from solvents such as in cosmetic uses, for suntan protectors, hair lacquers, wind protection and the like; whereas the higher boiling solvents are particularly useful where a high boiling, high viscosity index, low flammability fluid is desired for such uses as hydraulic fluids, brake fluids and the like.

It will be observed that the two tables above set out present only "Freons" which contain the methine group. It is found that the methine group is essential to a high solubility of polyvinylpyrrolidone in Freon. However, there are many other compounds such as those shown in the subjoining Table 3 which, while they do not contain methine groups, are useful in this invention, particularly as diluents, or boiling-point modifiers for the solution, since their presence in moderate amounts does not significantly reduce the solvent properties of the methine-containing compounds for the polymer.

TABLE 3

*Freons Which Do Not Contain Methine (—CH—) Groups*

| Freon number | Formula | B.P., °C. | M.P., °C. | Additional comments |
|---|---|---|---|---|
| 11 | $CCl_3F$ | 24 | −111 | $d^{17}$, 1.494 g./ml. |
| 12 | $CCl_2F_2$ | −29 | −160 | |
| 113 | $CCl_2F$—$CClF_2$ | 46 | 13 | $d^{25}$, 1.574 g./ml. |
| 114 | $CClF_2$—$CClF_2$ | 4 | −94 | $d°$, 1.531 g./ml. |
| 115 | $CClF_2$—$CF_3$ | −38 | −106 | |
| 142 | $CH_3$—$CClF_2$ | −10 | [1] −131 | $d^{-9.6}$, 1.194 g./ml. |

[1] "Genetron 101."

Still another group of usable compounds is presented in the subjoined Table 4. These, however, are less satisfactory since some of them are flammable and others difficult to liquefy because of the low boiling point. Nevertheless, all of these compounds are usable, at least as diluents, in the preparation of the composition of the present invention.

TABLE 4

*Freon-Like Compounds*

| Formula | B.P., °C. | M.P., °C. | Objectionable property |
|---|---|---|---|
| $CH_3$—$CHF_2$ | −25 | −117 | Flammable, slightly toxic. |
| $C_2H_3ClF_2$ | | | Flammable. |
| $CH_2$=$CHF$ | −72 | −160 | Do. |
| $CCl_2F$—$CClF_2$ | −48 | −103 | Difficult to liquefy. |
| $CHF_3$ | −82 | −163 | Difficult to liquefy, "Freon 23." |
| $CF_4$ | −128 | −184 | Difficult to liquefy, "Freon 14." Poor solvent. |
| $CClF_3$ | −81 | −181 | Difficult to liquefy, "Freon 13." Poor solvent. |

Still another group of compounds which are also usable, although less desirable, is shown in the subjoined Table 5.

TABLE 5

*Halides of Borderline Desirability*

| Formula | B.P., °C. | M.P., °C. | Toxicity | Flammable? | Tendency to polymerize? | Comments |
|---|---|---|---|---|---|---|
| $CCl_2$=$CF_2$ | 19 | −115 | Moderate | No | Yes | "Kel-F" monomer. |
| $CClF$=$CF_2$ | −28 | −157 | do | No | Yes | "Teflon" monomer. |
| $CF_2$=$CF_2$ | −78 | −144 | | No | Yes | |
| $CH_2$=$CF_2$ | Below −70 | | Only slight | | Yes | Low flash point. |
| $CH_2$=$CClF$ | −25 | | | | Yes | Do. |
| $CH_2Cl$—$CF_3$ | 6 | | | | No | $d°$, 1.389 g./ml. |
| $CH_2Cl$—$CClF_2$ | 47 | −101 | | | No | $d^{20}$, 1.416 g./ml. |
| $CH_2Cl$—$CCl_2F$ | 88 | −105 | | | No | $d^{20}$, 1.492 g./ml. |

It will be observed from these tables, that a solution of the desired polymer in almost any concentration may be obtained in a solvent boiling at almost any desired temperature by appropriate choice of mixed solvents from these various substances. If it is desired that the solution would stand relatively high ambient temperatures, the higher-boiling Freons should be chosen.

The important feature of the instant invention, however, is the obtaining of non-flammable, non-alcoholic, sprayable film-forming compositions wherein the Freons serve both as solvent and propellant. To this end, it is essential that the polyvinylpyrrolidone be anhydrous as well as the Freon or Freons used as the solvent propellant. It has been found that where water is present, the polyvinylpyrrolidone, or copolymer thereof, is insoluble in the Freons in the absence of alcohol, e.g., ethyl alcohol. Accordingly, in order to dissolve alcohol-free polyvinylpyrrolidone or copolymer thereof in Freons, it is absolutely essential to make them substantially anhydrous. This is a departure from prior art practices where aerosol compositions of either polyvinylpyrrolidone or a copolymer of 60% vinylpyrrolidone and 40% vinyl acetate containing water were first dissolved in alcohol and then the alcoholic solution was mixed with the Freons. As is well-known it is often highly desirable to have alcohol-free compositions, particularly in hair preparations.

The following examples, which are offered as indicating the best way of practicing the invention, not as limitations upon the claims.

EXAMPLE 1

A glass vessel containing 10 parts of Plasdone (the pharmaceutical grade of polyvinylpyrrolidone, Finkentscher K value of 32 which is 1000 times the $k$ value determined by the method described by H. Fikentscher in Cellulosechemie, 13, 60 (1932), manufactured by General Aniline and Film Corp.) was kept at 0° C. while Freon 21 ($CHCl_2F$, dichlorofluoromethane) was condensed in the vessel. By the time that 90 parts of Freon 21 had condensed, a clear, light yellow fluid solution resulted. It was fluid at least within the range of −60° C. to 3° C. In a sealed vessel, such as an aerosol bomb, the range could be extended considerably. In order to modify the solution for cosmetic purposes, small amounts of other ingredients may be added, such as the interpolymer of methyl vinyl ether and monobutyl maleate to reduce tackiness, emollient oil, perfume, and a bactericide. Ethyl alcohol may be added in some cases at concentrations below which it would create a fire hazard (if used in hair lacquers, for example).

EXAMPLE 2

An attempt was made to dissolve Plasdone in Freon 142 (Table 3, no methine group present) but the result was that only white, opaque, granular Plasdone floated on the clear, liquid 1-chloro-1,1-diffuoroethane below its boiling point of −10° C. Hence, K-32 polyvinylpyrrolidone is practically insoluble in $CH_3$—$CClF_2$, quite a contrast from the system illustrated in Example 1.

By adding ethyl alcohol in small increments, it was found that the minimum amount was 27 parts for a mixture of 90 parts of Freon 142 (also called Genetron 101) and 10 parts of polyvinylpyrrolidone at −15±5° C. The concentration of polyvinylpyrrolidone in this solution was approximately 8% and such a solution is not nearly so safe from the standpoint of fire as that described in Example 1. The flash point of ethyl alcohol is only 55° F.

EXAMPLE 3

Freon 113 (Table 3) is a liquid up to 46° C. Nevertheless, it is practically not a solvent for polyvinylpyrrolidone. Plasdone merely floats on it at room temperature. 1,1,2-trichloro-1,2,2-trifluoroethane contains no methine (solubilizing) group, but it is non-flammable and virtu-

EXAMPLE 4

Freon 114 was condensed at $-15\pm5°$ C. in a glass vessel containing Plasdone, but no significant amount of polyvinylpyrrolidone was dissolved. Even a larger proportion of ethyl alcohol was required than had been needed with Freons 113 and 142 in the foregoing examples. At least 63 parts of ethyl alcohol was required to solubilize a mixture of 10 parts of K–32 polyvinylpyrrolidone and only 70 parts of $CClF_2CClF_2$ at $-15\pm5°$ C. Of course this was a colder temperature than had been used with Freon 113 in Example 3, which might account in part for the greater proportion of ethyl alcohol required. The same temperature of $-15\pm5°$ C. was used in Example 2, which indicates that Freon 142 is somewhat better as a cosolvent than is Freon 114.

Freon 114 is more volatile than Freon 113. They both have virtually no toxic properties and are noncombustible, and are useful as diluents for methine-containing chlorofluoroalkanes, such as those listed in Tables 1 and 2.

EXAMPLE 5

A solution was formed by mixing 90 parts of 1,1-dichloro-2,2-difluoroethane and 10 parts of an interpolymer of 1-vinyl-2-pyrrolidone and vinyl acetate. Inasmuch as 10.7% of the solvent-free interpolymer was nitrogen (by analysis), the ratio of comonomers was 88/12.

Evaporation of some of this solution on the skin left a film which had an excellent protective effect in screening out infrared radiation.

EXAMPLE 6

A 10% solution of an interpolymer of isobutyl vinyl ether and 1-vinyl-2-pyrrolidone was prepared in 1,2,2-trichloro-1,1-difluoroethane. The solvent-free interpolymer had 10.1% nitrogen, indicating that the ratio of monomer units was 20/80. This solution was diluted with an equal weight of dichlorodifluoromethane (as propellant), and applied to hair as an aerosol. It was effective as a hair lacquer. The solution tolerance useful concentrations of 2,2′ - methylenebis(3,4,6 - trichlorophenol) (also called hexachlorophene and G–11), perfume, and lanolin, and was particularly easy to wash out.

EXAMPLE 7

A 2% solution of K–90 polyvinylpyrrolidone was prepared in 1,1,2-trichloro-2-fluoroethane, a dimethine liquid listed in Table 1. This preparation is useful as a dense, physiologically safe, non-flammable, hydraulic fluid. The K–90 polyvinylpyrrolidone has a high degree of polymerization and improves the viscosity characteristics of the solvent.

A glass vessel containing 13 parts of K–32 polyvinylpyrrolidone was kept at $-45\pm5°$ C. while Freon 22 ($CHClF_2$, chlorodifluoromethane) was condensed in the vessel. By the time that 87 parts of Freon 22 had condensed, a clear, straw-colored, fairly fluid solution resulted.

The following comment applies to Examples 1, 2, 3, 4, and 7: When a very thin layer of the solution which was finally obtained was poured on a glass plate and allowed to evaporate, then a colorless, clear film resulted. Below relative humidities of approximately 60% the film was tack-free. Agents which have been found for reducing tackines of polyvinylpyrrolidone at 70% relative humidity include derivatives of the interpolymers of alkyl vinyl ethers and maleic anhydride (as partial butyl and isobutyl esters of polyvinyl methyl ether/maleic anhydride, and the ammonium salt of the complex of polyvinyl methyl ether/maleic anhydride and polyvinylpyrrolidone) the ammonium salt of the complex of polyvinylpyrrolidone and polyacrylic acid, interpolymers of 1-vinyl-2-pyrrolidone and acrylonitrile (at least within the range of 13 to 25% acrylonitrile), shellac, polyvinyl formal, cellulose acetate, cellulose acetate propionate, methyl polymethacrylate, and carboxymethylcellulose. Softeners may be added to plasticize the film of 1-vinyl-2-pyrrolidone polymers, as for example, diethylene glycol, glycerol, sorbitol, carbethoxymethyl ethyl phthalate (Santocizer E–15), carbobutoxymethyl butyl phthalate (Santocizer B–16), benzyl butyl phthalate (Santocizer 160); and the following resins act as plasticizers in addition to minimizing tack; carboxymethylcellulose, cellulose acetate, polyvinyl formal, and methyl polymethacrylate.

EXAMPLE 8

K–60 polyvinylpyrrolidone was plasticized by the following procedure: Forty-five parts of polyvinylpyrrolidone, 24 parts of the interpolymer of methyl vinyl ether and monobutyl maleate, made by treating polyvinyl methyl ether/maleic anhydride with 1-butanol, and 31 parts of diethylene glycol were dissolved in ethyl alcohol. From this solution, two films were cast in glass weighing-dishes and dried over calcium chloride at an absolute pressure of approximately 50 mm. of mercury for one week. During this period the relative humidity was 4 to 11%. The resulting films were 4 to 8 mils thick. They were clear, colorless, well plasticized, and tack-free.

The films were aged at 100% humidity for three days. The films remained clear, colorless, well plasticized with good elasticity, and become only slightly tacky.

EXAMPLE 9

The above data indicated that polyvinylpyrrolidone (and other vinylpyrrolidone polymers) can be modified for several applications, e.g., aerosol-dispensed hair lacquers. Here the need for a plasticized, tack-free film of polyvinylpyrrolidone would arise, even under extremes of humidity. The following composition is recommended: 77 to 92 parts of K–32 polyvinylpyrrolidone, 2 to 11 parts of a half butyl ester of polyvinyl methyl ether/maleic anhydride, and 6 to 12 parts of diethylene glycol. The resulting lacquer could be removed easily from the hair. In addition to helping to plasticize the film, the interpolymer derived from methyl vinyl ether, maleic anhydride, and 1-butanol would reduce tackiness. Furthermore, the high hygroscopicity of these compositions conceivably could enhance the effectiveness of the lacquer in very damp weather without increasing tackiness.

Compositions of polyvinylpyrrolidone, polyvinyl methyl ether/maleic anhydride half butyl ester, and diethylene glycol may find application where the films must be soluble in ethyl alcohol, but insoluble in water. Applications may include film for food packaging, films for incorporation of infrared, visible, or ultraviolet absorbers, optical brighteners, or fluorescers, or films for nail polishes. In such applications, the concentration of polyvinyl methyl ether/maleic anhydride half butyl ester should be approximately 50% by weight of the polyvinylpyrrolidone in order to impart sufficient resistance to the dissolving action of water.

Vinylpyrrolidone polymers are unusual in that they are both gums and resins, that is, they are quite soluble in water and at the same time quite soluble in many organic solvents. Furthermore they are either physiologically inert or beneficial, and have a thickening, detoxifying, cleansing, or lacquering effect often desired in certain cosmetic applications. Aerosol-dispensed cosmetics are becoming very popular. Vinylpyrrolidone polymers have made non-flammable, non-toxic hair lacquers possible because these polymers are soluble in non-toxic, non-flammable solvents such as those listed in Tables 1 and 2. Because of packaging limitations, water is not used in aerosol containers. Yet it is desirable to have cosmetics which are water-soluble, that is, which can be washed off the skin or hair when desired. Vinylpyrrolidone polymers fill both of these requirements, whereas most other high-molecular-weight materials are poor compromises.

Thus the composition of matter of the invention polymerizes vinyl pyrrolidone with or without other unsaturates and dissolves the resulting polymer in a "Freon" type of solvent to produce a fluid having a wide range of very valuable uses as above pointed out.

The term "1-vinyl-2-pyrrolidone," as employed in the claims, is to be construed as including within its scope not only the homopolymers, but also heteropolymers, copolymers, interpolymers and terpolymers of 1-vinyl-2-pyrrolidone.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

What is claimed is:

1. A non-flammable, sprayable film-forming composition consisting essentially of an anhydrous solution of an anhydrous polymer of 1-vinyl-2-pyrrolidone and, both as solvent and propellant, at least one liquid chlorofluoro alkane hydrocarbon having 1 to 2 carbon atoms and 1 to 2 unreplaced hydrogens.

2. A non-flammable, sprayable film-forming composition consisting essentially of an anhydrous solution of an anhydrous polymer of 1-vinyl-2-pyrrolidone having a K value between 30 and 90 and, both as solvent and propellant, at least one liquid chlorofluoroalkane hydrocarbon having 1 to 2 carbon atoms and 1 to 2 unreplaced hydrogens.

3. A non-flammable, sprayable film-forming composition consisting essentially of an anhydrous solution of an anhydrous copolymer of 1-vinyl-2-pyrrolidone and a copolymerizable monomer selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-ethoxyethyl vinyl ether, phenyl vinyl ether, acrylic acid, methacrylic acid, maleic anhydride, chloromaleic anhydride, citraconic anhydride, itaconic anhydride, methyl methacrylate, hexyl acrylate, methyl alpha-chloroacrylate, acrylonitrile, methacrylonitrile, acrylamide, methacrylamide, acrolein, alphamethylacrolein, styrene, ethylene, isoprene, 1,3-butadiene, isopropenylbenzene and 9 - vinylcarbazole wherein said 1-vinyl-2-pyrrolidone is a substantial component of said copolymer and, both as solvent and propellant, at least one liquid chlorofluoroalkane hydrocarbon having 1 to 2 carbon atoms and 1 to 2 unreplaced hydrogens.

4. A non-flammable, sprayable film-forming composition consisting essentially of an anhydrous solution of an anhydrous copolymer of 1-vinyl-2-pyrrolidone having a K value between 30 and 90 and a copolymerizable monomer selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-ethoxyethyl vinyl ether, phenyl vinyl ether, acrylic acid, methacrylic acid, maleic anhydride, chloromaleic anhydride, citraconic anhydride, itaconic anhydride, methyl methacrylate, hexyl acrylate, methyl alpha-chloroacrylate, acrylonitrile, methacrylonitrile, acrylamide, methacrylamide, acrolein, alphamethylacrolein, styrene, ethylene, isoprene, 1,3-butadiene, isopropenylbenzene and 9-vinylcarbazole wherein said 1-vinyl-2-pyrrolidone is a substantial component of said copolymer and, both as solvent and propellant, at least one liquid chlorofluoroalkane hydrocarbon having 1 to 2 carbon atoms and 1 to 2 unreplaced hydrogens.

5. A non-flammable, sprayable film-forming composition consisting essentially of an anhydrous solution of an anhydrous copolymer of 1-vinyl-2-pyrrolidone and vinyl acetate wherein said 1-vinyl-2-pyrrolidone is a substantial component of said copolymer and, both as solvent and propellant, at least one liquid chlorofluoroalkane hydrocarbon having 1 to 2 carbon atoms and 1 to 2 unreplaced hydrogens.

6. A non-flammable, sprayable film-forming composition consisting essentially of an anhydrous solution of an anhydrous copolymer of 1-vinyl-2-pyrrolidone having a K value between 30 and 90 and vinyl acetate wherein said 1-vinyl-2-pyrrolidone is a substantial component of said copolymer and, both as solvent and propellent, at least one liquid chlorofluoroalkane hydrocarbon having 1 to 2 carbon atoms and 1 to 2 unreplaced hydrogens.

References Cited in the file of this patent

UNITED STATES PATENTS 2,667,473    Morner et al. _____ Jan. 26, 1954

OTHER REFERENCES

Schimmel brief No. 233, August 1954.
GAF publication, "PVP in Pressurized Products," 1954, 167–PVP.